(12) United States Patent
Sakhnini et al.

(10) Patent No.: US 11,764,867 B2
(45) Date of Patent: Sep. 19, 2023

(54) COMMUNICATION OF SATELLITE INFORMATION FOR NON-TERRESTRIAL NETWORKS

(71) Applicant: QUALCOMM Incorporated, San Diego, CA (US)

(72) Inventors: Iyab Issam Sakhnini, San Diego, CA (US); Jun Ma, San Diego, CA (US); Qiang Wu, San Diego, CA (US); Xiao Feng Wang, San Diego, CA (US); Dan Zhang, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 17/154,497

(22) Filed: Jan. 21, 2021

(65) Prior Publication Data
US 2021/0242935 A1 Aug. 5, 2021

Related U.S. Application Data

(60) Provisional application No. 62/967,986, filed on Jan. 30, 2020.

(51) Int. Cl.
*H04B 7/185* (2006.01)
*H04W 52/14* (2009.01)
(Continued)

(52) U.S. Cl.
CPC ....... *H04B 7/18543* (2013.01); *H04B 7/0617* (2013.01); *H04B 7/1855* (2013.01);
(Continued)

(58) Field of Classification Search
CPC ........ H04B 7/185–2041; H04B 7/1855; H04B 7/18519; H04B 7/18543; H04B 7/0617;
(Continued)

(56) References Cited

U.S. PATENT DOCUMENTS 8,674,877 B1 * 3/2014 Mateski .................. G01S 19/06
                                                342/357.42
10,601,497 B2 * 3/2020 Haley ............... H04W 52/0216
(Continued)

OTHER PUBLICATIONS

International Search Report and Written Opinion—PCT/US2021/014687—ISA/EPO—dated Nov. 29, 2021.
(Continued)

*Primary Examiner* — Raymond S Dean
(74) *Attorney, Agent, or Firm* — Holland & Hart LLP

(57) ABSTRACT

This disclosure provides systems, methods and apparatus for communicating a satellite behavior change. In one aspect, a satellite identifies a satellite behavior change to occur for the satellite of a non-terrestrial network for cellular communications. The apparatus also signals the satellite behavior change to a user equipment serviced by the satellite. In another aspect, a user equipment obtains, from a satellite servicing the user equipment, a signaling of a satellite behavior change to occur for the satellite. The user equipment also adjusts one or more user equipment parameters for cellular communication based on the obtained signaling. The satellite behavior change may include a satellite attitude or a transmit power or coverage area of one or more satellite beams. The user equipment parameters may include satellite or beam selection or reselection to listen to paging information, satellite or beam handover parameters, or transmit power control parameters.

28 Claims, 8 Drawing Sheets

(51) Int. Cl.
*H04W 68/00* (2009.01)
*H04B 7/06* (2006.01)
*H04W 72/23* (2023.01)

(52) U.S. Cl.
CPC ...... *H04B 7/18519* (2013.01); *H04W 52/143* (2013.01); *H04W 68/005* (2013.01); *H04W 72/23* (2023.01)

(58) Field of Classification Search
CPC .. H04W 52/143; H04W 68/005; H04W 72/23
See application file for complete search history.

(56) References Cited

U.S. PATENT DOCUMENTS

| | | | |
|---|---|---|---|
| 2012/0322447 A1 | 12/2012 | Ramachandran et al. | |
| 2013/0286848 A1 | 10/2013 | Xu et al. | |
| 2017/0208494 A1* | 7/2017 | Moon | H04L 5/0048 |
| 2018/0167172 A1* | 6/2018 | Hosseini | H04W 72/1215 |
| 2018/0175932 A1* | 6/2018 | Lucky | H04B 7/2041 |
| 2018/0241464 A1 | 8/2018 | Michaels | |
| 2019/0041526 A1* | 2/2019 | Lucky | G01S 19/27 |
| 2019/0245614 A1* | 8/2019 | Lucky | H04B 7/204 |
| 2019/0246454 A1* | 8/2019 | Niu | H04L 1/18 |
| 2019/0373590 A1* | 12/2019 | Tabet | H04W 72/042 |
| 2020/0068348 A1* | 2/2020 | Li | G01S 19/04 |
| 2020/0178135 A1* | 6/2020 | Yun | H04W 36/0061 |
| 2020/0313755 A1* | 10/2020 | Chuang | H04B 7/1855 |

OTHER PUBLICATIONS

Mediatek USA Inc: "Improving Cell Reselection Using Next Cell Information in NTN," 3GPP Draft, 3GPP TSG-RAN WG2 Meeting #107-Bis, R2-1912655_Improving Cell Reselction Using Next Cell Information in NTN, 3rd Generation Partnership Project (3GPP), Mobile Competence Centre, 650, Route Des Lucioles, F-06921, Sophia-Antipolis Cedex, France, vol. RAN WG2, No. Chongqing, China, Oct. 14, 2019-Oct. 18, 2019, Oct. 3, 2019 (Oct. 3, 2019), XP051790694, 3 pages, Retrieved from the Internet: URL: http://www.3gpp.org/ftp/tsg_ran/WG2_RL2/TSGR2_107bis/Docs/R2-1912655.zip [retrieved on Oct. 3, 2019], the whole document.

Nokia, et al., "Analysis on Mobility Aspects in NTN with Earth-Fixed Beam", 3GPP Draft, 3GPP TSG-RAN WG3 #102, R3-186662 EFB, 3rd Generation Partnership Project (3GPP), Mobile Competence Centre, 650, Route Des Lucioles, F-06921, Sophia-Antipolis Cedex, France, vol. RAN WG3, No. Spokane, USA, Nov. 12, 2018-Nov. 16, 2018, Nov. 11, 2018 (Nov. 11, 2018), XP051558434, 4 pages, Retrieved from the Internet: URL: http://www.3gpp.org/ftp/Meetings%5F3GPP%5FSYNC/RAN3/Docs/R3%2D186662%2Ezip [retrieved on Nov. 11, 2018], the whole document.

ZTE Corporation, et al., "Utilization of the Ephemeris Information in Cell Selection and Re-selection", 3GPP Draft, 3GPP TSG-RAN WG2 Meeting#107, R2-1909261_Utilization of the Ephemeris Information in Cell Selection and Reselection, 3rd Generation Partnership Project (3GPP), Mobile Competence Centre, 650, Route Des Lucioles, F-06921, Sophia-Antipolis Cedex, France, vol. RAN WG2, No. Prague, Czech, Aug. 26, 2019-Aug. 30, 2019, Aug. 15, 2019 (Aug. 15, 2019), XP051767065, 3 pages, Retrieved from the Internet: URL: http://www.3gpp.org/ftp/tsg_ran/WG2_RL2/TSGR2_107/Docs/R2-1909261.zip [retrieved on Aug. 15, 2019], the whole document.

\* cited by examiner

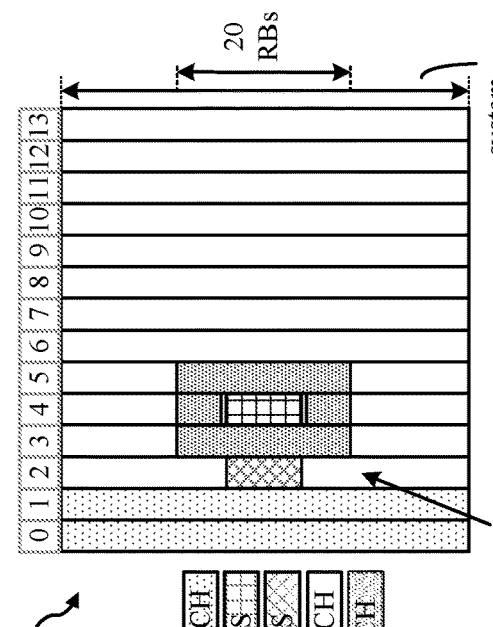
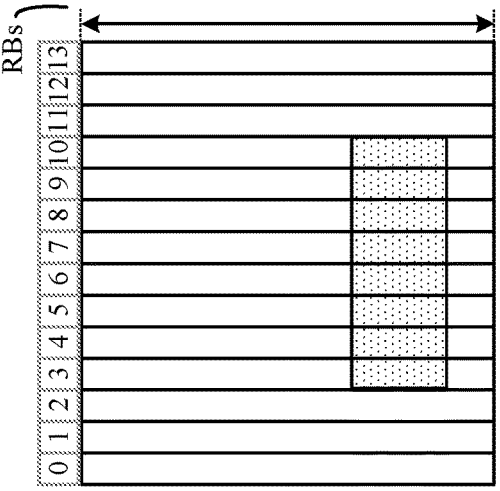
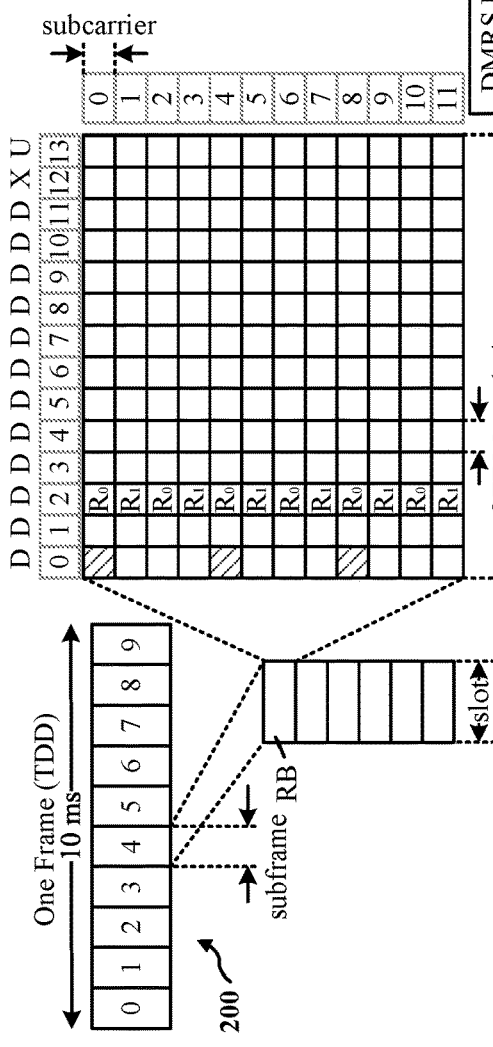
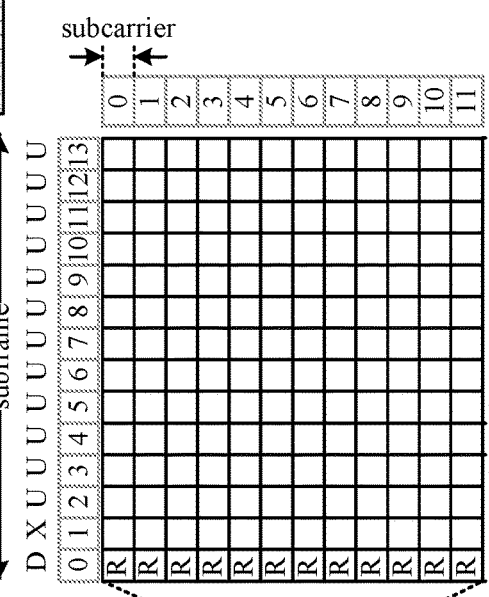
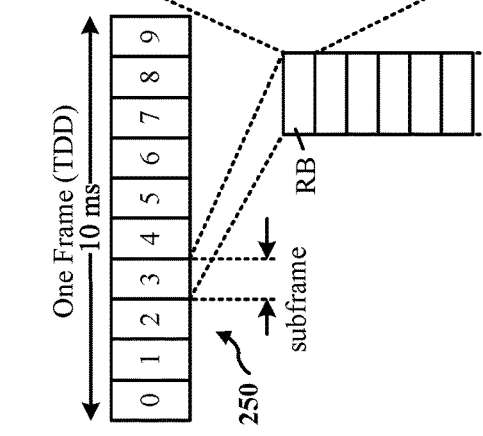
Figure 2A  Figure 2B  Figure 2C  Figure 2D

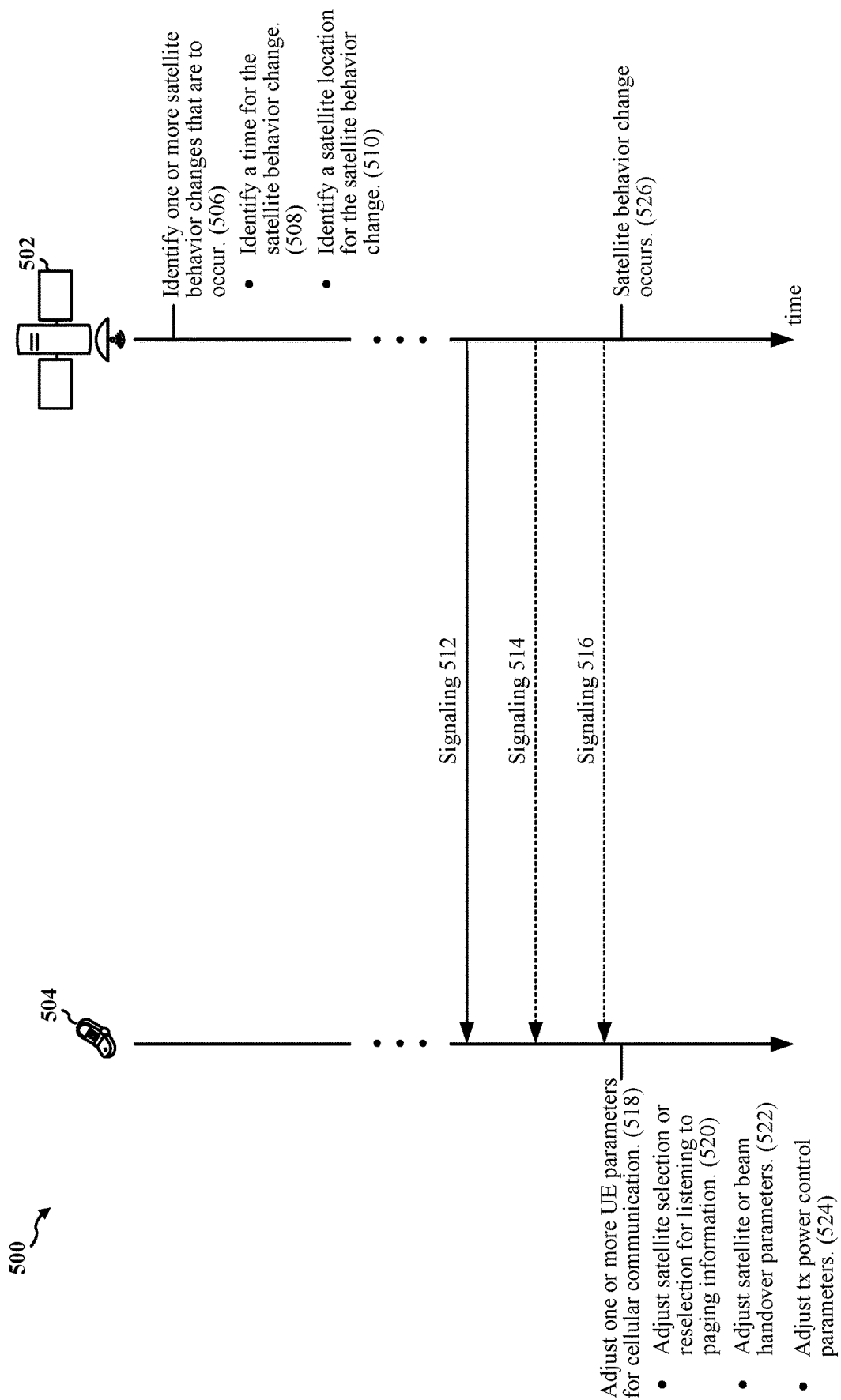

600

Identify a satellite behavior change to occur for a satellite of an NTN for cellular communications. (602)

Signal, by the satellite, the satellite behavior change to a UE serviced by the satellite. (604)

Identify a satellite behavior change to occur. (612)

Identify a satellite attitude change. (614)

Identify a transmit power change. (616)

Identify a coverage area change. (618)

Identify a time when or a satellite location where the satellite behavior change is to occur. (620)

Identify a time to begin the satellite behavior change. (622)

Identify a time duration. (624)

Identify a satellite location to begin the satellite behavior change. (626)

Identify a satellite location to end the satellite behavior change. (628)

Output contents of a vector or table indicating the satellite behavior change. (632)

Output a satellite ID for the satellite. (634)

Output a satellite attitude adjustment and time or satellite location for the adjustment. (636)

Output a transmit power adjustment and time or satellite location for the adjustment. (638)

Output a beam coverage adjustment and time or satellite location for the adjustment. (640)

Identify one or more neighboring satellite behavior changes to occur for one or more neighboring satellites of the NTN. (652)

Signal, by the satellite, the one or more neighboring satellite behavior changes to the UE. (654)

| Obtain, from a satellite of an NTN servicing the UE, a signaling of a satellite behavior change to occur for the satellite. (702) |

| Adjust one or more UE parameters for cellular communication based on the obtained signaling. (704) |

| Obtain an indication of the satellite behavior change. (712) |
|---|
| Obtain a satellite ID of the satellite to have the behavior change. (714) |
| Obtain an indication of a satellite attitude adjustment and time or satellite location for the adjustment. (716) |
| Obtain an indication of a transmit power adjustment and time or satellite location for the adjustment. (718) |
| Obtain an indication of a beam coverage adjustment and time or satellite location for the adjustment. (720) |

Figure 7B

COMMUNICATION OF SATELLITE INFORMATION FOR NON-TERRESTRIAL NETWORKS

CROSS REFERENCE

The present Application for Patent claims the benefit of U.S. Provisional Patent Application No. 62/967,986 by SAKHNINI et al., entitled "COMMUNICATION OF SATELLITE INFORMATION FOR NON-TERRESTRIAL NETWORKS," filed Jan. 30, 2020, assigned to the assignee hereof, and expressly incorporated by reference herein.

TECHNICAL FIELD

This disclosure relates generally to wireless communication and, more specifically, to communication satellite information for non-terrestrial networks.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal-frequency-division-multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems (e.g., non-terrestrial networks (NTNs)) may utilize satellites (which may broadly refer to any high-altitude platform (e.g., drones)) as relay devices between ground base stations and ground gateways. In NTNs, the satellite may be moving at a high-speed relative to UEs operating within the NTN, which may be at or relatively near ground level. In some implementations, a satellite is configured to emit one or more beams for a coverage area provided by the satellite to a UE. The satellite's orientation or beam transmission characteristics may be adjusted to change the coverage provided to the UE. Solutions for communicating the satellite's changes to the UE may be desired.

SUMMARY

The systems, methods and apparatuses of this disclosure each have several innovative aspects, no single one of which is solely responsible for the desirable attributes disclosed herein. One innovative aspect of the subject matter described in this disclosure can be implemented as a method performed by an apparatus of a satellite, and may include identifying a satellite behavior change to occur for the satellite of a non-terrestrial network for cellular communications. The method may also include signaling, by the satellite, the satellite behavior change to a user equipment (UE) serviced by the satellite.

The satellite behavior change may include one or more of a satellite attitude, a transmit power of one or more satellite beams, or a coverage area of one or more satellite beams. Signaling the satellite behavior change may include indicating a time when the satellite behavior change is to occur, or a satellite location where the satellite behavior change is to occur. The time may include a start time of the satellite behavior change. The time also may include a time duration of the satellite behavior change. The satellite location may include a start location of the satellite behavior change. The satellite location also may include an end location of the satellite behavior change.

Signaling the satellite behavior change may include outputting contents of a vector or table. The contents may include a satellite identification and one or more of a satellite attitude adjustment and a time or satellite location associated with the satellite attitude adjustment, a transmit power adjustment and a time or satellite location associated with the transmit power adjustment, or a beam coverage adjustment and a time or satellite location associated with the beam coverage adjustment.

The method may also include restricting signaling of the satellite behavior change to a defined period of time before the satellite behavior change is to occur. The method may further include identifying one or more neighboring satellite behavior changes to occur for one or more neighboring satellites of the non-terrestrial network for cellular communications, and signaling, by the satellite, the one or more neighboring satellite behavior changes along with signaling the satellite behavior change.

Signaling the satellite behavior change may include outputting information for the satellite behavior change in one or more system information blocks (SIBs) to the UE. The method may also include indicating, in a SIB1 to the UE, a scheduling of the information to be output. The SIB1 may indicate whether the information is to be output periodically by the satellite. The SIB1 may also indicate one or more parameters of a periodicity of the output. The outputted information may be included in one or more existing SIBs, or the outputted information may be included in one or more new SIBs. The outputted information may be included in a SIB defined to indicate a satellite ephemeris.

The method may also include restricting outputting the information for the satellite behavior change in the one or more SIBs to a defined period of time before the satellite behavior change is to occur. The method may also include indicating to the UE that one or more SIBs including the information for the satellite behavior change are to be output to the UE. Indicating that one or more SIBs are to be output may be via paging the UE.

The method may also include signaling one or more neighboring satellite behavior changes in the one or more SIBs. The signaling of the satellite behavior change may be in a first set of SIBs of the one or more SIBs. The signaling of the one or more neighboring satellite behavior changes may be in a second set of SIBs of the one or more SIBs.

Signaling the satellite behavior change may be in a dedicated signaling between the satellite and the UE. The dedicated signaling may be during a connected mode between the satellite and the UE.

Another innovative aspect of the subject matter described in this disclosure can be implemented in an apparatus of a satellite. The apparatus may include one or more processors coupled to a memory. The memory may store instructions that, when executed by the one or more processors, cause the satellite to perform a number of operations to perform the aforementioned method.

Another innovative aspect can be implemented in a satellite including means for performing the operations of the aforementioned method.

Another innovative aspect can be implemented in a computer-readable medium. The computer-readable medium may include instructions that, when executed by one or more processors of a satellite, cause the satellite to perform the operations of the aforementioned method.

Another innovative aspect of the subject matter described in this disclosure can be implemented as a method performed by an apparatus of a UE, and may include obtaining, from a satellite servicing the UE, a signaling of a satellite behavior change to occur for the satellite, wherein the satellite is included in a non-terrestrial network for cellular communications. The method may also include adjusting one or more UE parameters for cellular communication based on the obtained signaling.

The one or more UE parameters include one or more of satellite or beam selection or reselection to listen to paging information, satellite or beam handover parameters, or transmit power control parameters. The satellite behavior change may include one or more of changing a satellite attitude, changing a transmit power of one or more satellite beams, or changing a coverage area of one or more satellite beams. The signaling of the satellite behavior change may include an indication of a time when or a satellite location where the satellite behavior change is to occur. The time may include a start time of the satellite behavior change. The time also may include a time duration of the satellite behavior change. The satellite location may include a start location of the satellite behavior change. The satellite location also may include an end location of the satellite behavior change.

Obtaining the signaling of the satellite behavior change may include obtaining contents of a vector or table. The contents may include a satellite identification and one or more of a satellite attitude adjustment and a time or satellite location associated with the satellite attitude adjustment, a transmit power adjustment and a time or satellite location associated with the transmit power adjustment, or a beam coverage adjustment and a time or satellite location associated with the beam coverage adjustment. The method may also include obtaining, from the satellite, signaling of one or more neighboring satellite behavior changes to occur for one or more neighboring satellites of the non-terrestrial network for cellular communications.

Obtaining the signaling of the satellite behavior change includes obtaining information for the satellite behavior change in one or more SIBs from the satellite. The method may also include obtaining an indication, in a SIB1 from the satellite, a scheduling of the information to be obtained. The SIB1 may indicate whether the information is to be output periodically by the satellite. The SIB1 may also indicate one or more parameters of a periodicity of the output. The obtained information may be included in one or more existing SIBs, or the obtained information may be included in one or more new SIBs. The obtained information may be included in a SIB defined to indicate a satellite ephemeris.

The method may also include obtaining, from the satellite, an indication that one or more SIBs including the information for the satellite behavior change are to be output by the satellite. The indication may be via paging by the satellite to the UE.

The method may also include obtaining one or more neighboring satellite behavior changes in the one or more SIBs. The signaling of the satellite behavior change may be in a first set of SIBs of the one or more SIBs. The signaling of the one or more neighboring satellite behavior changes may be in a second set of SIBs of the one or more SIBs.

Obtaining the satellite behavior change may be in a dedicated signaling between the satellite and the UE. The dedicated signaling may be during a connected mode between the satellite and the UE Another innovative aspect of the subject matter described in this disclosure can be implemented in an apparatus of a UE. The apparatus may include one or more processors coupled to a memory. The memory may store instructions that, when executed by the one or more processors, cause the UE to perform a number of operations to perform the aforementioned method.

Another innovative aspect can be implemented in a UE including means for performing the operations of the aforementioned method.

Another innovative aspect can be implemented in a computer-readable medium. The computer-readable medium may include instructions that, when executed by one or more processors of a UE, cause the UE to perform the operations of the aforementioned method.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A shows an example of a first slot within a 5G/NR frame structure.

FIG. 2B shows an example of downlink (DL) channels within a 5G/NR slot.

FIG. 2C shows an example of a second slot within a 5G/NR frame structure.

FIG. 2D shows an example of uplink (UL) channels within a 5G/NR slot.

FIG. 5 shows a sequence diagram illustrating an example message exchange between a satellite and a user equipment (UE).

FIG. 6A shows a flowchart illustrating an example process for indicating one or more satellite behavior changes to a UE.

FIG. 6B shows a flowchart illustrating an example process for identifying one or more satellite behavior changes to occur.

FIG. 6C shows a flowchart illustrating an example process for signaling one or more satellite behavior changes to a UE.

FIG. 6D shows a flowchart illustrating an example process for indicating one or more neighboring satellite behavior changes to a UE.

FIG. 7A shows a flowchart illustrating an example process for UE operation based on a satellite behavior change.

FIG. 7B shows a flowchart illustrating an example process for a UE to obtain a satellite behavior change.

Like reference numbers and designations in the various drawings indicate like elements.

DETAILED DESCRIPTION

Figure 1:
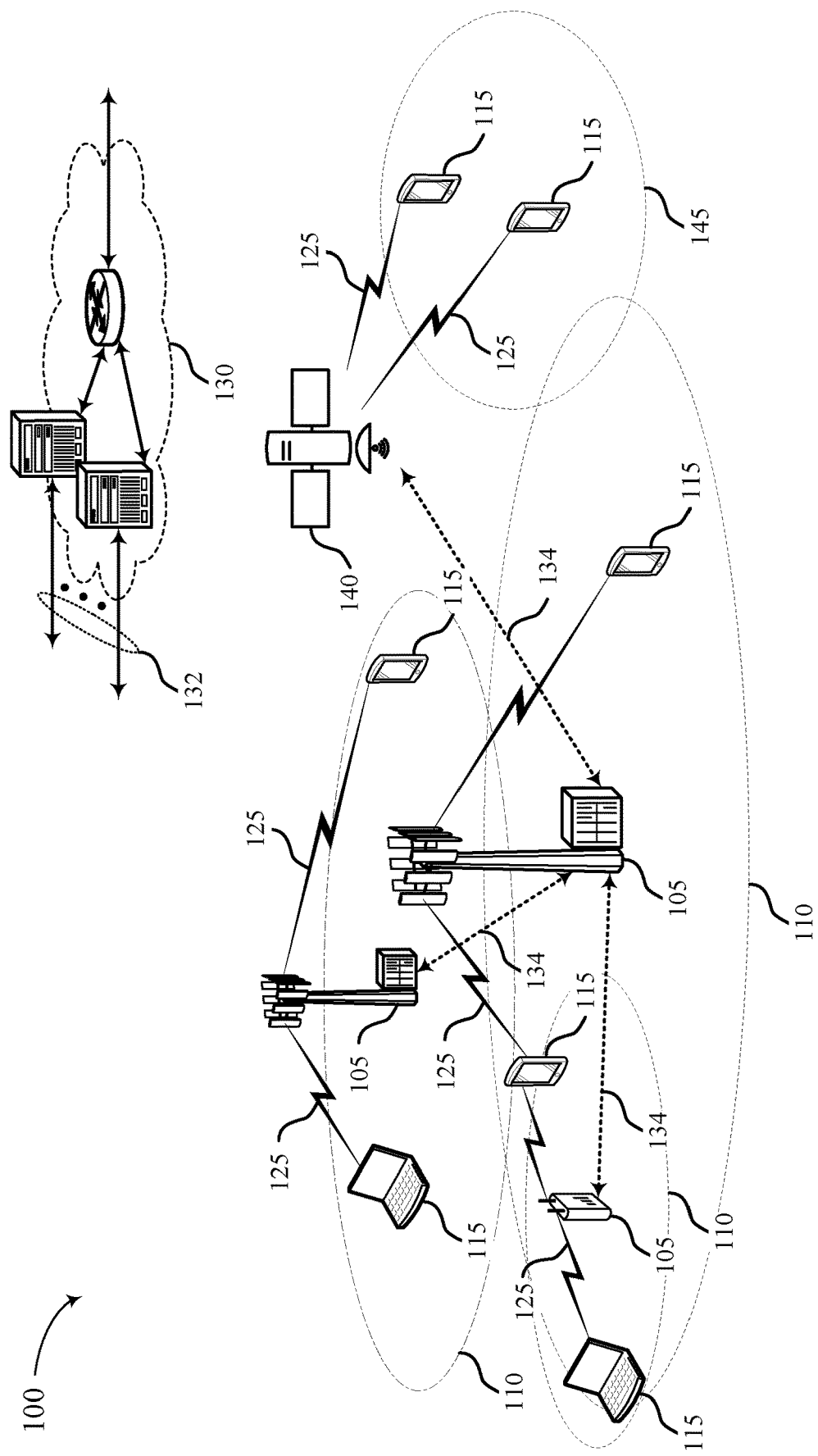
FIG. 1 shows a diagram of an example wireless communications system and an access network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Various implementations relate generally to communicating a satellite behavior change of a satellite in a non-terrestrial network (NTN) wireless communications system (also referred to as an NTN cellular communication system) to a user equipment (UE) serviced by the satellite. A satellite may transmit one or more satellite beams (also referred to as beams) to service one or more UEs in a coverage area (such as provide downlink (DL) traffic to the UE and receive uplink (UL) traffic from the UE). Each beam may have similar or its own bandwidth part (BWP) and other beam-specific parameters (such as physical random-access channel (PRACH) parameters, timers, delay-specific configurations, and so on) for the UE to communicate with the network (such as communicating with the satellite, and the satellite communicating with a base station).

A satellite of the NTN includes an ephemeris, and a coverage area of the satellite for a cellular network is dependent on the ephemeris. A UE configured for the NTN may be aware of the satellite ephemeris of the satellites of the NTN (e.g., the UE may otherwise be aware of the coverage area of a satellite of the NTN). In this manner, a UE may determine that the UE is to be serviced by a specific satellite for a certain geographic area at a certain time. As a result, the UE may sense one or more beams from the satellite for DL communications or may attempt to access a random access channel (RACH) for the satellite for UL communications.

In addition to a satellite's ephemeris, a satellite's coverage area is dependent on a satellite behavior. A satellite behavior refers to one or more characteristics effecting the satellite's coverage for UEs serviced by the network, and may include a transmit power for one or more beams, a focus of one or more beams, and a satellite attitude (including a roll, pitch, and yaw of the satellite). A satellite behavior change may occur during operation of the NTN. In some implementations, a satellite may reduce or increase the number of beams, reduce or increase the transmit power of each beam, adjust a transmit direction of one or more beams, or change a relative orientation or behavior (e.g., pitch or roll) to adjust the NTN's coverage for UEs. For example, the network may determine that a geographic area is not to be within a coverage area at least one satellite in the NTN. The network may thus indicate to a satellite to perform a behavior change (such as pitching and rolling the satellite) in order to cover the geographic area. In another example, a satellite beam may become inoperable, and the network may indicate to the satellite to adjust one or more remaining beams to compensate for the inoperable beam. In a further example, a satellite may become inoperable, and the network may indicate to one or more satellites to perform a behavior change to compensate for the inoperable satellite.

In some cases, a UE is unaware of a satellite behavior change. For example, a UE may expect to be serviced by a specific beam or a specific satellite, but a satellite behavior change may cause the NTN to service the UE using a different beam or a different satellite. As a result, the UE may not be configured to be serviced by the different beam or the different satellite. For example, the UE may sense for signals on a different carrier frequency, may sense for signals based on a different transmit power parameter, may search for a different satellite ID, may attempt to transmit to an incorrect satellite, and so on to cause issues in the NTN servicing the UE.

In some implementations, a satellite of an NTN may be configured to signal a satellite behavior change to a UE. In this manner, the UE may be aware of the satellite behavior change, and adjust one or more UE parameters for cellular communication based on the satellite behavior change. For example, a satellite may signal to the UE one or more of a satellite attitude change, a beam coverage area change, or a beam transmit power change that is to occur at a specific time or at a specific satellite location. The UE may then adjust one or more of parameters for satellite or beam reselection (such as a specific signal quality requirement for reselection), satellite or beam handover parameters (such as a link metric to be measured and reported by the UE for a possible handover), or transmit power control parameters to the satellite. In this manner, the UE is configured to be serviced by the satellite after the satellite behavior change.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system 100 and an access network. The wireless communications system 100 includes base stations 105, UEs 115, one or more satellites 140, and a core network 130. In some examples, the wireless communications system 100 may be a Long Term Evolution (LTE) network, an LTE-Advanced (LTE-A) network, an LTE-A Pro network, or a New Radio (NR) network. In some implementations, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations, a base station included in a satellite 140 of an NTN, and so on). The UEs 115 described herein may be able to communicate with various types of base stations 105 and network equipment including macro eNBs, small cell eNBs, gNBs, relay base stations, and the like.

Each base station 105 may be associated with a particular satellite coverage area 110 in which communications with various UEs 115 are supported. Each base station 105 may provide communication coverage for a respective satellite coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

Wireless communications system 100 may be a non-terrestrial network (NTN) and may utilize one or more satellites 140 (which may broadly refer to any high-altitude platform) (e.g., as relay devices). For example, base stations 105 (or ground gateways) may wirelessly communicate with UEs 115 via one or more satellites 140 (e.g., or high-altitude platforms). The satellites 140 may relay communications between base stations 105 and UEs 115, or in some implementations comprise or otherwise perform functions ascribed herein to base stations 105. Each satellite 140 may be associated with a geographic area 145 in which communications with various UEs 115 is supported. In some implementations, a geographic area 145 may have properties ascribed herein to geographic coverage areas 110. Each satellite 140 may provide communication coverage for a respective geographic area 145 via communication links 125, and communication links 125 between a satellite 120 and a UE 115 may utilize one or more carriers.

Communication links 125 shown in wireless communications system 100 may include upstream transmissions from a UE 115 (e.g., to a satellite 140, to a base station 105 via satellite 140), or downstream transmissions to a UE 115 (e.g., from a satellite 140, from a base station 105 via satellite 140). In some implementations, transmissions from the ground (e.g., from a UE 115 or base station 105) to a satellite 140 may be referred to as uplink transmissions and transmissions from a satellite 140 to the ground (e.g., to a UE 115 or base station 105) may be referred to as downlink transmissions. Thus, depending on whether a gateway (e.g., a base station 105) may be collocated with (e.g., included in) a satellite 140 or at the ground, either upstream or downstream transmissions may include a mix of uplink and downlink transmissions.

Downstream transmissions may also be called forward link transmissions while upstream transmissions may also be called reverse link transmissions. A geographic area 145 may be an area associated with a transmission beam of a satellite 140. In some implementations, a geographic area 145 may be referred to as a beam footprint.

The geographic coverage area 110 for a base station 105 or the geographic area 145 for a satellite 140 may be divided into sectors making up only a portion of the geographic coverage area 110 or the geographic area 145, and in some implementations, each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 or satellite 140 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some implementations, the term "cell" may refer to a portion of a geographic coverage area 110 or geographic area 145 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some implementations, UEs 115 may be designed to support critical functions (e.g., mission critical functions), and a wireless communications system 100 may be configured to provide ultra-reliable communications for these functions.

In some implementations, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some implementations, groups of UEs 115 communicating via D2D communications may utilize a one-to-many (1:M) system in which each UE 115 transmits to every other UE 115 in the group. In some implementations, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130). Base stations 105 may communicate with satellites 140 wirelessly over backhaul links 134 (e.g., via an X2 or another interface).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some implementations, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some implementations, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some implementations, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105, satellite 140, or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105, a satellite 140) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a satellite 140, a base station 105, or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a satellite 140 or a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna sub-arrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some implementations, the antennas of a base station 105, a satellite 140, or UE 115 may be located within one or more antenna arrays, which may support MIMO operations, or transmit or receive beamforming. For example, one or more base station antennas or antenna arrays may be co-located at an antenna assembly, such as an antenna tower. In some implementations, antennas or antenna arrays associated with a base station 105 or satellite 140 may be located in diverse geographic locations. A base station 105 or a satellite 140 may have an antenna array with a number of rows and columns of antenna ports that the base station 105 or the satellite 140 may use to support beamforming of communications with a UE 115. Likewise, a UE 115 may have one or more antenna arrays that may support various MIMO or beamforming operations.

In some implementations, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some implementations perform packet segmentation and reassembly to communicate over logical channels. A Media Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some implementations, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some implementations, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as Tf=307,200 Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some implementations, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some aspects, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini slots are aggregated together and used for communication between a UE 115 and a base station 105 or between a UE 115 and a satellite 140.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In some implementations, a carrier may be subdivided into portions, each portion having a smaller bandwidth than the carrier bandwidth (e.g., 100 MHz), and such portions may be referred to as bandwidth parts or BWPs. For example, some devices (e.g., some UEs 115) may not support the full bandwidth of a carrier, and thus may communicate using one or more BWPs. In some implementations, a UE 115 may establish communications with a base station 105 or satellite 140 using a first BWP, which may be referred to as an initial BWP, and the UE 115 may thereafter switch to a different BWP. In some implementations, BWPs may be paired or otherwise grouped. For example, a UE 115 may communicate using paired or grouped uplink and downlink BWPs (e.g., in an FDD implementation). Further, in some implementations a UE 115 that switches to a different BWP may switch (e.g., concurrently or simultaneously or as part of a single BWP-switching operation) from a first pair or other group of BWPs to a second pair or other group BWPs.

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some implementations, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some implementations, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some implementations, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115, base station 105, or satellite 140 utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some implementations, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

FIG. 2A shows an example of a first slot 200 within a 5G/NR frame structure. FIG. 2B shows an example of DL channels 230 within a 5G/NR slot. FIG. 2C shows an example of a second slot 250 within a 5G/NR frame structure. FIG. 2D shows an example of UL channels 280 within a 5G/NR slot. The 5G/NR frame structure may be FDD in which, for a particular set of subcarriers (carrier system bandwidth), slots within the set of subcarriers are dedicated for either DL or UL In other cases, the 5G/NR frame structure may be TDD in which, for a particular set of subcarriers (carrier system bandwidth), slots within the set of subcarriers are dedicated for both DL and UL. In the examples shown in FIGS. 2A and 2C, the 5G/NR frame structure is configured as TDD, with slot 4 being configured with slot format 28 (with mostly DL), where D indicates DL, U indicates UL, and X indicates that the slot is flexible for use between DL/UL, and slot 3 being configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). This format may also apply to a 5G/NR frame structure that is FDD.

Other wireless communication technologies may have a different frame structures and/or different channels. A frame (10 ms) may be divided into 10 equally sized subframes (1 ms). Each subframe may include one or more time slots. Subframes may also include mini slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\wedge}\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 microseconds ($\mu$s).

A resource grid may be used to represent the frame structure. Each time slot includes a resource block (RB) (also referred to as a physical RB (PRB)) that extends across 12 consecutive subcarriers and across a number of symbols. The intersections of subcarriers and symbols of the RB define multiple resource elements (REs). The number of bits carried by each RE depends on the modulation scheme.

As illustrated in FIG. 2A, some of the REs carry a reference (pilot) signal (RS) for the UE. In some configurations, one or more REs may carry a demodulation RS (DM-RS) (indicated as Rx for one particular configuration, where 100x is the port number, but other DM-RS configurations are possible). In some configurations, one or more REs may carry a channel state information reference signal (CSI-RS) for channel measurement at the UE. The REs may also include a beam measurement RS (BRS), a beam refinement RS (BRRS), and a phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

As noted herein, a satellite behavior change may occur during operation of an NTN. For example, a satellite may be instructed by the network to adjust a beam focus, adjust a beam transmit power, adjust a beam transmit direction, pitch, roll, or yaw. In this manner, the satellite adjusts a coverage for the NTN.

Figure 3:
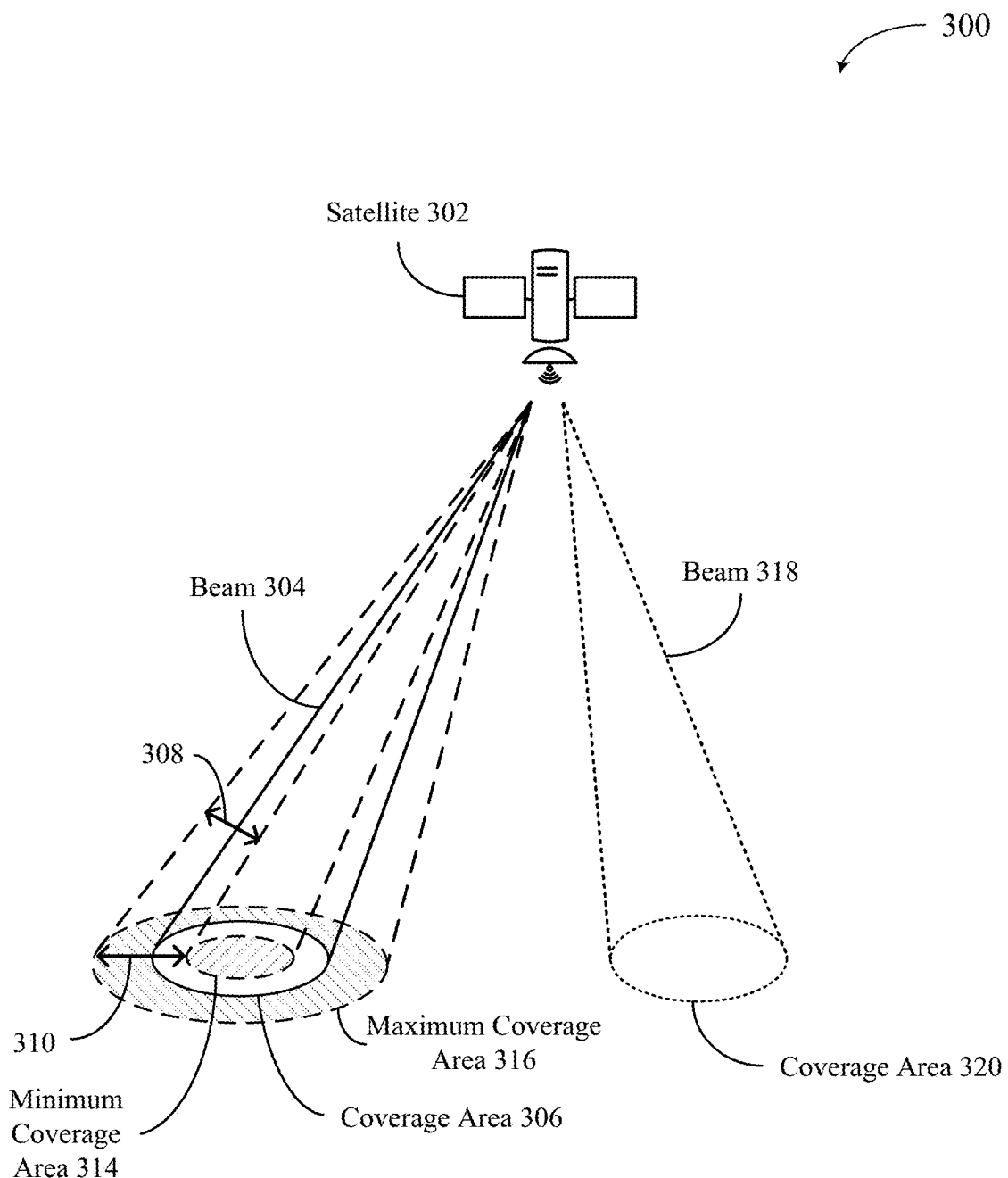
FIG. 3 shows an example portion of a non-terrestrial network (NTN) wireless communications system including a satellite for beam adjustments.

FIG. 3 shows an example portion of an NTN wireless communications system 300 including a satellite 302. In some examples, the NTN wireless communications system 300 may include aspects of wireless communications system 100. For example, satellite 302 may be an example of a satellite 140 as described with reference to FIG. 1.

FIG. 3 illustrates a focus of satellite beam 304 being adjusted. Beam 304 is associated with a geographic coverage area 306. One possible satellite behavior change of the satellite 302 is to adjust the focus of the beam 304 (illustrated by adjustment 308) to adjust an associated geographic area (illustrated by 310). In this manner, the coverage area 306 may be adjusted between a minimum coverage area 314 and a maximum coverage area 316. In some examples, a beam focus may be adjusted to ensure coverage of a geographical area (such as by widening the beam). In some implementations, the beam focus may be adjusted by adjusting a position or orientation of one or more antennas configured to output the beam. The size of the coverage area 306 may affect a received signal strength at a UE. For example, a larger coverage area may be associated with a weaker signal received at the UE. As a result, a carrier sense threshold or other UE parameter may be associated with a beam focus.

In some implementations, the satellite 302 may be configured to transmit multiple beams (such as including beam 318 associated with geographic coverage area 320). The additional beams may be adjusted similar to beam 304. While examples may depict one beam transmitted by a satellite, such examples do not preclude the satellite transmitting multiple beams. A single beam is illustrated for ease in explaining aspects of the disclosure.

While not explicitly shown in FIG. 3, the satellite 302 may be configured to adjust a transmit power of the beam 304. Some geographic locations may be associated with power output restrictions. For example, an airport, a hospital, and so on may require a lower maximum power output for the NTN at those sites than other sites. In another example, different countries may have different maximum power output requirements. During some times, the satellite 302 may enter a power save mode reducing a beam transmit power. For example, at night or during times when less UEs are to be serviced, the satellite 302 may reduce a transmit power for one or more beams. The beam transmit power may affect a received signal strength for the beam at the UE. As a result, a carrier sense threshold or other UE parameter may be associated with a beam transmit power.

While not explicitly shown in FIG. 3, the satellite 302 may be configured to adjust a transmit direction of the beam 304. In some implementations, a position or orientation of one or more antennas configured to output the beam may be adjusted. For example, if the satellite 302 outputs multiple beams, and one beam fails (e.g., the beam is malfunctioning), the satellite may adjust the transmit direction of the other beams (in addition or alternative to adjusting the beam transmit power and the beam focus) to compensate for the loss of coverage caused by the failed beam. If one or more beam transmit directions are adjusted, a UE may be serviced by a different beam than before the adjustment. As a result, one or more UE parameters associated with the beam transmit direction may need adjustment for the NTN to continue servicing the UE. For example, a UE parameter may include beam reselection parameters for the UE to select a beam after adjustment. In another example, handover by the network may be adjusted based on the satellite behavior change, and the UE may need to measure one or more link metrics for handover.

In some implementations, a satellite may adjust the attitude. For example, a satellite may be configured to pitch, roll, and yaw. As used herein, pitch, roll, and yaw are rotational angles for orienting a satellite with reference to the earth. Pitch may refer to a rotation of the satellite along a first axis tangential to the earth. Roll may refer to a rotation of the satellite along a second axis tangential to the earth and perpendicular to the first axis (with a plane defined by the first axis and the second axis being tangential to the earth). Yaw may refer to a rotation of the satellite along a third axis connecting the satellite and the earth (with the third axis perpendicular to the first axis and perpendicular to the second axis such that a plane defined by the third axis and the first axis or second axis bisects the earth).

Figure 4A:
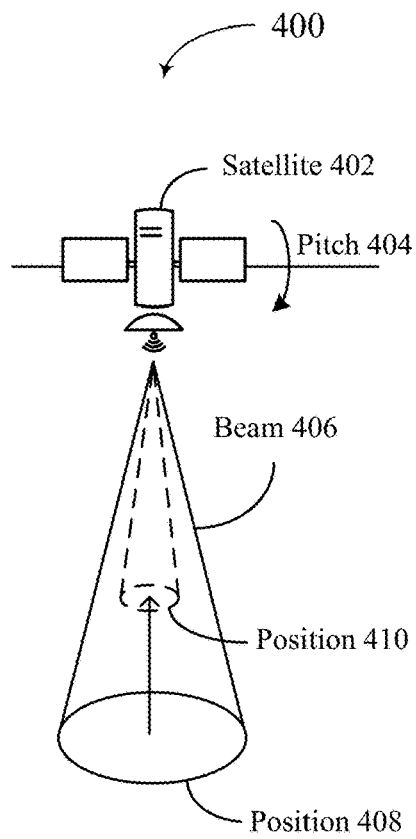
FIG. 4A shows an example portion of an NTN wireless communications system including a satellite for pitch adjustments.

FIG. 4A shows an example portion of an NTN wireless communications system 400 including a satellite 402. In some examples, the NTN wireless communications system 400 may include aspects of wireless communications system 100. For example, satellite 402 may be an example of a satellite 140 as described with reference to FIG. 1.

FIG. 4A illustrates an adjustment of the pitch 404 of the satellite 402. For a pitch 404 at a first angle, the satellite 402 outputs a beam 406 associated with a geographic coverage area at position 408. If the pitch 404 is adjusted to a second angle, the geographic coverage area associated with the beam 406 moves to a position 410.

Figure 4B:
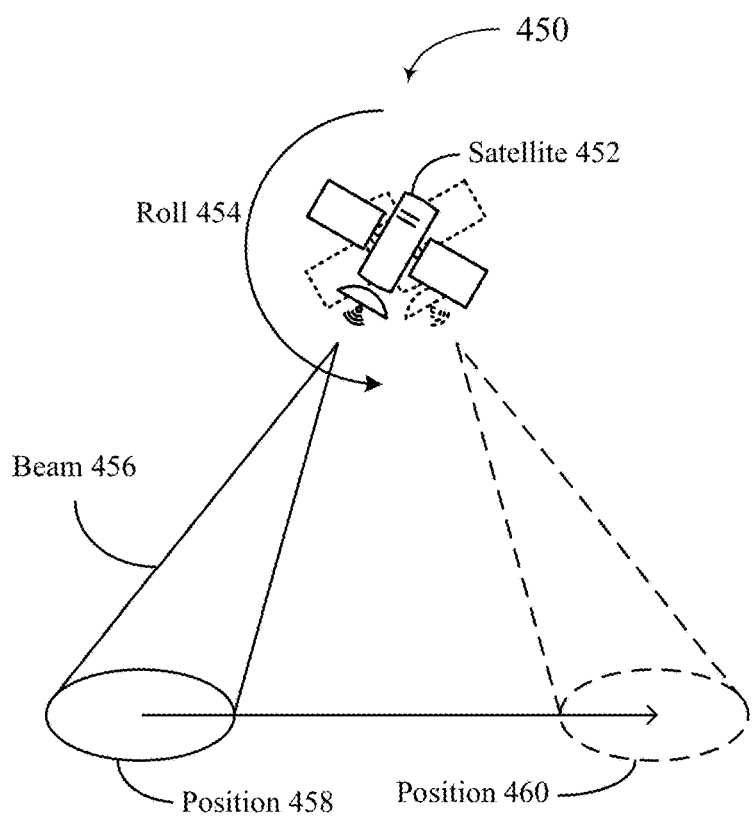
FIG. 4B shows an example portion of an NTN wireless communications system including a satellite for roll adjustments.

FIG. 4B shows an example portion of an NTN wireless communications system 450 including a satellite 452. In some examples, the NTN wireless communications system 450 may include aspects of wireless communications system 100. For example, satellite 452 may be an example of a satellite 140 as described with reference to FIG. 1.

FIG. 4B illustrates an adjustment of the roll 454 of the satellite 452. For a roll 454 at a first angle, the satellite 452 outputs a beam 456 associated with a geographic coverage area at position 458. If the roll 454 is adjusted to a second angle, the geographic coverage area associated with the beam 456 moves to a position 460.

While not explicitly shown, the satellite may also adjust a yaw, which may adjust a position of a geographic coverage area of a satellite beam. In this manner, the satellite may adjust one or more of a pitch, a roll, or a yaw to adjust a geographic coverage area of the one or more beams output by the satellite.

As depicted herein, one or more satellite behavior changes in an NTN may occur. In some implementations, the satellite is configured to signal the behavior changes to a UE before the behavior changes occur. In this manner, the UE may be configured to continue communicating with the network via one or more satellites after the satellite behavior changes. For example, the UE may configure itself based on the obtained indication of the satellite behavior changes to occur to know which satellite or which beam is to service the UE. After the satellite behavior changes, the UE may directly initiate UL or DL communications with the satellite in the NTN using the known parameters for the beam to be used for the UE (such as UL BWP, DL BWP, PRACH, and so on). In addition, or to the alternative, the UE may be configured to listen for signals from the beam or satellite known to service the UE after the satellite behavior change based on the known beam parameters.

FIG. 5 shows a sequence diagram illustrating an example message exchange 500 between a satellite 502 and a UE 504. In some implementations, the satellite 502 may be one example of the satellite 140 of FIG. 1, the satellite 302 of FIG. 3, the satellite 402 of FIG. 4A, or the satellite 452 of FIG. 4B. The UE 504 may be one example of the UE 115 of FIG. 1. The access network may be a 5G NR access network (or other suitable access network). In some implementations, the satellite 502 may act as a relay for communications between the UE 504 and a base station (not shown for simplicity). In some other implementations, a base station may be physically integrated with the satellite 502. For example, the satellite 502 may perform one or more of the functions ascribed to the base station 105 of FIG. 1.

The satellite 504 may include a multitude of antennas that can be configured to wirelessly transmit or receive information on a plurality of different beams. For simplicity, only one beam may be described for the example of FIG. 5. However, in actual implementations, the satellite 504 may be capable of providing any number of beams. Multiple beams may belong to a same cell and are therefore associated with the same cell identifier (ID). However, in other implementations, multiple beams may belong to separate cells having separate cell IDs.

As shown in FIG. 5, the satellite 502 identifies one or more satellite behavior changes that may occur (506). In some implementations, the network (such as a ground network) may determine that a satellite is to perform one or more behavior changes. For example, different countries, continents, or other geographic regions may require a different maximum transmit power for one or more satellite beams. If a satellite moves with reference to the earth's geography (the satellite is not geostationary), the satellite's associated geographic coverage area may move between one or more countries, continents, or other geographic regions. As a result, the network may determine that the transmit power for one or more satellite beams is to be adjusted based on the difference in required maximum transmit power. The network may then signal the satellite behavior change to one or more satellites (such as the satellite 502 in FIG. 5).

In another example, the NTN may be required to refrain from servicing a specific geographic region. For example, the NTN may ensure that the geographic coverage area associated with the beams does not encroach an airport with radio detection and ranging (RADAR) or other instrumentation to prevent interference. The network may determine, as a satellite's associated geographic coverage area approaches the airport, to pitch or roll the satellite to cause the associated geographic coverage area to bypass the airport (such as pitching or rolling the satellite 502 in FIG. 5). The network may then signal the satellite behavior change to one or more satellites (such as the satellite 502 in FIG. 5).

In a further example, a satellite or a satellite beam of the NTN may fail, causing a loss of coverage in a geographic area. The network may identify that the satellite or beam has failed (such as the failed satellite or a neighboring satellite indicating the failure to a ground network via a base station). The network may then determine that one or more satellites are to be pitched or rolled, or one or more beam transmit directions are to be adjusted to compensate for the failed satellite or beam. The network may then signal the satellite behavior change to one or more satellites of the NTN (such as the satellite 502 in FIG. 5).

In some implementations, the satellite 502 may determine one or more satellite behavior changes to occur. For example, if the satellite 502 provides multiple beams and one beam fails. The satellite 502 may determine to adjust the remaining beams to compensate for the failed beam. The satellite 502 may signal the satellite behavior change to the network via a base station.

A satellite behavior change may be based on a time or a location of the satellite to perform the behavior change. In some implementations, the satellite 502 may identify a time for the satellite behavior change (508). For example, the network may signal to the satellite 502 (such as via a base station) when the satellite behavior change is to occur. In another example, the satellite 502 may determine when the satellite 502 will perform a behavior change. The network or the satellite 502 may determine a time far enough into the future to allow the satellite 502 (or other satellites of the NTN) to signal the satellite behavior change to one or more UEs before the satellite behavior change is to occur.

With reference to time, the network may synchronize components to a local time (specific to the network) or a global time (such as Greenwich Mean Time (GMT) or Universal Time). In some implementations, the satellite 502 identifies a start time for the satellite behavior change (such as a local start time or a global start time). The satellite behavior change may persist for an unknown amount of time or may be permanent. For example, if a satellite or beam fails, the satellite behavior change may be permanent or until the failed satellite or beam is repaired (which may be at an unknown time in the future). Alternatively, the satellite behavior change may be for a known amount of time. For example, the network may know the amount of time needed for the satellite's associated geographic coverage area to bypass an airport based on the satellite behavior change and the satellite's ephemeris.

In some implementations, the satellite 502 identifies a time duration of the satellite behavior change in addition to the start time. For example, the network or the satellite 502 may determine an amount of time (from the start time) that the satellite behavior change is to persist before returning to a previous state. In another example, the network or the satellite 502 may determine an end time when the satellite is to return to a previous state.

With reference to a satellite location, a satellite behavior change may be associated with any suitable location. In some implementations, a satellite behavior change may be associated with a location of the satellite with reference to the earth (such as a specific latitude or longitude). For example, a satellite location may be associated with the satellite's geographic coverage area being located at a specific geographic region of the earth (such as a specific country, a specific continent, a specific hemisphere, and so on) for which the satellite behavior change is to occur.

In some implementations, the satellite 502 may identify a satellite location for the satellite behavior change (510). In some implementations, the network may determine the satellite location for the behavior change and signal the location to a satellite (such as via a base station). In some other implementations, the satellite may determine the satellite location for the behavior change.

In some implementations, the satellite 502 identifies a start location of the satellite behavior change. For example, the network or the satellite 502 may determine a location of the satellite (such as a latitude and/or longitude, or other suitable geospatial location information) when the satellite's geographic coverage area is to encroach a specific geographic region. The network or the satellite 502 may then determine that the satellite behavior change is to occur at the determined location (or a previous location before reaching the determined location) to adjust the satellite's coverage.

If the satellite behavior change is to end at a specific location (such as after a satellite's geographic coverage area is to pass a specific continent, country, or the like), the satellite 502 may identify an end location of the satellite behavior change (when the satellite is to return to a previous state) in addition to the start location. For example, the network may determine the end location and signal the end location to the satellite 502 (such as via a base station). In another example, the satellite may determine the end location.

One or more components of the network may store the satellite behavior changes (such as past and known future satellite behavior changes) in a table or vector. In some implementations, a table may include entries for the satellite behavior changes of the NTN. An example entry may include a satellite ID of the satellite to perform (or that previously performed) one or more satellite behavior changes, one or more specific satellite behavior changes (such as a specific roll or pitch of the satellite, a change in beam transmit power, or the like), and one or more times or satellite locations when satellite behavior changes are to occur (or previously occurred).

The contents of the table (or vector) for a satellite to perform one or more satellite behavior changes may include the satellite ID and one or more of: a satellite attitude adjustment (such as a pitch, roll, or yaw) and a time or satellite location associated with the satellite attitude adjustment (such as a start time or start location and a time duration or an end location, respectively); a transmit power adjustment (such as a beam transmit power adjustment) and a time or satellite location associated with the transmit power adjustment; or a beam coverage adjustment (such as a beam focus or a beam transmit direction) and a time or satellite location associated with the beam coverage adjustment. In some implementations, the satellite 502 may store a copy of the table, which may be updated by the network (such as via a base station). In some other implementations, the network 502 may store the table on a land-based component, and the network may signal content from the table to the satellite 502 for the satellite 502 to signal the content to one or more UEs.

Referring back to FIG. 5, after the satellite 502 identifies one or more satellite behavior changes that are to occur (including a time or a location for the satellite behavior change), the satellite 502 may indicate the one or more satellite behavior changes to the UE 504 via signaling 512. In some implementations, the signaling may be periodic or otherwise repeated (indicated by signaling 514 and signaling 516) to ensure that the UE 504 obtains the indication of the one or more satellite behavior changes to occur.

The satellite 504 may output contents of the table (or vector) including the satellite IDs and the satellite behavior changes to be performed. For example, the network may signal contents of the table to the satellite 502, and the satellite may package and signal (via signaling 512) the received contents to the UE 504. In another example, the satellite 502 may output contents of a table stored locally at the satellite 502.

The satellite 502 may signal to the UE 504 an indication of one or more satellite behavior changes to be performed by the satellite 502. In some implementations, the satellite 502 is also configured to signal to the UE 504 an indication of one or more satellite behavior changes to be performed by one or more neighboring satellites in the NTN. In this manner, the UE 504 may be apprised of a satellite behavior change even if the UE 504 is not in a geographic coverage area associated with the satellite to perform the satellite behavior change.

For example, the satellite 502 may identify one or more neighboring satellite behavior changes to occur for one or more neighboring satellites of the NTN. In some implementations, the network may determine one or more behavior changes to occur across the satellites of the NTN (such as when a satellite becomes temporarily unavailable), and the network may determine that the satellite 502 is to signal the neighboring satellite behavior changes to the UEs serviced by the satellite 502 (including UE 504). In this manner, the network may signal the neighboring satellite behavior changes to the satellite 502 (such as via a base station).

The satellite 502 may signal the neighboring satellite behavior changes to the UE 504. For example, after receiving the neighboring satellite behavior changes from a base station, the satellite 502 may package and signal the neighboring satellite behavior changes to the UE 504. The indication of the neighboring satellite behavior changes may be in addition to an indication of one or more satellite behavior changes to be performed by the satellite 502.

In signaling the UE 504, the satellite 502 may output the contents including a satellite ID for the UE 504 to identify which satellite is to perform the behavior changes (such as the satellite 502 or a neighboring satellite) and information regarding the satellite behavior changes to be performed. For example, the information regarding the satellite behavior changes may include one or more of: a satellite attitude adjustment (such as a pitch, roll, or yaw) and a time or satellite location associated with the satellite attitude adjustment (such as a start time or start location and a time duration or an end location, respectively); a transmit power adjustment (such as a beam transmit power adjustment) and a time or satellite location associated with the transmit power adjustment; or a beam coverage adjustment (such as a beam focus or a beam transmit direction) and a time or satellite location associated with the beam coverage adjustment.

Any suitable signaling may be used by the satellite 502 to provide the indication of the one or more satellite behavior changes to the UE 504. In some implementations, a dedicated signaling between the satellite 502 and the UE 504 may be used for signaling the satellite behavior change. For example, the UE 504 may be in a connected mode with the satellite 502 such that a dedicated communication link is used for the satellite 502 and the UE 504 to communicate. The satellite 502 may signal the one or more satellite behavior changes to the UE 504 during the connected mode.

The satellite 502 may output information regarding the one or more satellite behavior changes in one or more SIBs to the UE 504. In some implementations, the satellite 504 may indicate in a SIB1 the scheduling of the information to be output to the UE 504 (such as in further SIBs). For example, the SIB1 may indicate whether the information regarding a satellite behavior change will be output periodically. If the information is to be output periodically, the SIB1 may also indicate one or more parameters of the periodicity of the output (such as a frequency, an offset, a time delay, an end to the periodic output, and so on). For example, the SIB1 may indicate an interval of specific SIBs or an interval of time between instances of outputting the indication of the one or more satellite behavior changes to the UE 504.

In some implementations, the outputted information indicating the one or more satellite behavior changes is included in one or more existing SIBs. For example, contents of the table for a specific satellite or a specific behavior change may be appended to an existing SIB to be transmitted from the satellite 502 to the UE 504. For example, an indication of a satellite behavior change may be appended to an end of a SIB2 or other suitable SIB. In some other implementations, the outputted information indicating the one or more satellite behavior changes is included in one or more new SIBs defined to indicate the satellite behavior changes. In one example, a SIB defined to indicate a satellite ephemeris to the UE 504 may also include information regarding one or more satellite behavior changes. In another example, a SIB may be defined specifically for indicating one or more satellite behavior changes to occur (including the satellite ID of the satellite to perform the behavior change, the type of behavior change, and the time when or the location where the behavior change is to be performed).

If the satellite 502 is configured to signal to the UE 504 one or more neighboring satellite behavior changes in addition to one or more satellite behavior changes to be performed by the satellite 502, the one or more behavior changes to be performed by the satellite 502 may be signaled in a first set of SIBs, and the one or more neighboring satellite behavior changes may be signaled in a second set of SIBs. The SIB1 may indicate the scheduling of the different sets of SIBs. In one example, the satellite 502 behavior changes may be indicated in SIB2, and the neighboring behavior changes may be indicated in one or more of SIB3-SIB8.

The time when the network or the satellite 502 determines that a behavior change is to be performed may be any time before the behavior change will be performed by the satellite. For example, a behavior change may be defined hours, days, weeks, and so on before the behavior change is performed. UEs may be handed over between multiple satellites, beams, or cells before the behavior change is to occur. As a result, the UEs listening to transmissions from the satellite 502 when determined that a behavior change is to occur may differ from the UEs being serviced by the satellite 502 when the behavior change is to occur. In some implementations, the satellite restricts signaling a satellite behavior change to a defined period of time before the satellite behavior change is to occur.

For example, the network may determine that the satellite 502 is to be rolled one day after the determination. The network may indicate to the satellite 502 the roll operation to be performed and the time or location to perform the roll. The network may also indicate to the satellite 502 to not begin signaling the UE 504 or other UEs about the roll to be performed until five minutes, fifteen minutes, or another suitable amount of time before the satellite 502 performs the roll. The satellite 502 may prevent signaling the UE 504 about the behavior change until the indicated time before the behavior change is to occur. In another example, the satellite 502 may be preprogrammed (or otherwise determine when) to prevent signaling the UE 504 until a defined time before a satellite behavior change is to occur.

If the satellite 502 uses one or more SIBs to indicate the satellite behavior change to the UE 504, the satellite 502 may prevent sending one or more newly defined SIBs until the time before the behavior change. In another example, the satellite 502 may prevent including the behavior change information in existing SIBs transmitted to the UE 504 until the time before the behavior change. In this manner, the satellite 502 may conserve resources by not transmitting the satellite behavior changes too far in advance (such as to UEs not impacted by the satellite behavior change because of intermediate handovers or cell reselections as they travel through the coverage area of the network).

To ensure that a UE 504 receives the indication that one or more satellite behavior changes are to occur, the satellite 502 may indicate to the UE 504 that the information regarding one or more satellite behavior changes are to be output. For example, the satellite 502 may indicate to the UE 504 that one or more forthcoming SIBs are to include satellite behavior change information. In some implementations, the satellite may use paging to notify the UE 504 that information is coming. For example, if the UE 504 is idle, the satellite 502 may probe the UE 504 by sending a paging message. In this manner, the UE 504 is removed from an idle mode to respond to the paging message, and the UE 504 is active and sensing of signals from the satellite 502 that are destined for the UE 504 (such as the SIBs including the satellite behavior change information).

Referring back to FIG. 5, the UE 504 receives the signaling 512 (or signaling 514, 516, or the like). In this manner, the UE 504 may obtain, from the satellite 502, the signaling of the satellite behavior change to occur. For example, after decoding the signaling (such as one or more SIBs), the UE 504 may obtain the contents of the table indicating the one or more satellite behavior changes to be performed. The UE 504 may thus identify which satellite is to perform a satellite behavior change, the type of satellite behavior change to occur, and the time when or the satellite location where the satellite behavior change is to occur.

Based on the obtained signaling, the UE 504 may adjust one or more UE parameters for cellular communication (518). In some implementations, the UE 504 adjusts satellite selection or reselection for listening for paging information (such as a paging message to be woken from an idle mode) (520). For example, if the satellite servicing the UE 504 changes as a result of the behavior change, the UE 504 may configure listening for the paging message from the correct satellite and beam to be woken from an idle mode. In some further implementations, the UE 504 adjusts satellite or beam handover parameters (522). For example, the UE 504 may determine that the UE 504 may be serviced by a different beam or satellite as a result of a handover caused or influenced by a satellite behavior change. The UE 504 may, for example, increase a frequency of measuring and reporting a link metric for a handover, adjust which link metric is measured, adjust a trigger event for reporting link metrics, and so on based on the one or more satellite behavior changes. In some additional implementations, the UE 504 adjusts one or more transmit power control parameters (524). For example, the satellite servicing the UE 504 after the satellite behavior change (such as the satellite 502) may have different received signal strength requirements. In another example, an adjustment of a satellite orientation or beam orientation may require the UE 504 to adjust a transmit power to send UL communications to the satellite. In a further example, if communications are handed over to another satellite, the distance between the UE 504 and the servicing satellite may change such that the transmit power is to be adjusted by the UE 504. Additional UE parameters for cellular communication may exist, as the provided examples are for illustrative purposes in explaining aspects of the disclosure. As such, the UE parameters are not limited by this disclosure to the provided examples.

As noted herein, the adjustment to one or more UE parameters is based on one or more satellite behavior changes, which may include a change in one or more of: a satellite attitude; a transmit power of one or more beams; or a coverage area of one or more beams. Furthermore, as noted herein, the signaling of the satellite behavior change may include a time when or a satellite location where the satellite behavior change is to occur. The time may include a start time (and optionally a time duration), and the satellite location may include a start location (and optionally an end location), such as described herein.

As noted herein, the signaling 512 may include information about one or more neighboring satellite behavior changes (which may be in addition to information about one or more behavior changes to be performed by the satellite 502). The UE 504 may obtain one or more neighboring satellite behavior changes. For example, as described herein, one or more neighboring satellite behavior changes may be indicated in one or more SIBs (such as a first set of SIBs for the behavior change to be performed by the satellite 502 and a second set of SIBs for the neighboring satellite behavior changes). As noted herein, the SIB1 may indicate scheduling information for the indication of satellite behavior changes (such as a scheduling of SIBs including the indication and so on). The UE 504 may determine whether the information regarding the satellite the scheduling from the obtained SIB1 (such as whether the information is to be provided periodically, a periodicity, and so on). In some other examples, the signaling 512 may be dedicated signaling between the satellite 503 and the UE 504.

Also as noted herein, the information about one or more satellite behavior changes may be obtained from existing SIBs (such as from an appendix to existing SIBs) or may be obtained from new SIBs (such as SIBs defined to indicate one or more satellite behavior changes). In some implementations, the information may be obtained during a dedicated messaging between the satellite 502 and the UE 504 (such as during a connected mode). Further, as noted herein, the satellite 502 may indicate that information about a satellite behavior change is forthcoming via paging. In this manner, the UE 504 may obtain a paging message to indicate such information is coming, and the UE 504 may response to the satellite 502 and otherwise listen to signals transmitted by the satellite 502 for the information (such as one or more SIBs configured to include the indication of one or more satellite behavior changes).

Referring back to FIG. 5, the UE 504 may be configured to adjust the one or more UE parameters in a manner to synchronize operation of the UE 504 with the timing of one or more satellite behavior changes. As shown, the satellite 502 may perform one or more satellite behavior changes (526). In one example, the UE 504 adjusting the one or more UE parameters (518) may be timed to occur approximately when the satellite behavior change occurs. Otherwise, operation of the UE 504 is configured to use the adjusted UE parameters at an appropriate time to coincide with the satellite behavior change occurring.

In this manner, a UE is apprised of behavior changes in satellites of an NTN for cellular communications, and the UE may adjust operation accordingly to reduce or minimize possible service disruptions caused by a satellite behavior change.

FIG. 6A shows a flowchart illustrating an example process 600 for indicating one or more satellite behavior changes to a UE. In some implementations, the process 600 may be performed by an apparatus, which may be an apparatus included in a satellite or the satellite itself, such as satellite 140 in FIG. 1, satellite 302 in FIG. 3, satellite 402 in FIG. 4A, satellite 452 in FIG. 4B, or satellite 502 in FIG. 5. At 602, an apparatus may identify a satellite behavior change to occur for a satellite of an NTN for cellular communication. For example, a network may determine one or more satellite behavior changes are to occur, and the network may signal the determined behavior changes to occur to the satellite. At 604, the apparatus (such as the satellite) may signal the satellite behavior change to a UE serviced by the satellite. For example, the satellite may transmit one or more SIBs to the UE indicating the satellite behavior change that is to occur.

As noted herein, a satellite behavior change may include different adjustments to a satellite. Additionally, occurrence of a satellite behavior change may be based on a time or a satellite location.

FIG. 6B shows a flowchart illustrating an example process 610 for identifying one or more satellite behavior changes to occur. The process 610 may be an example implementation of step 602 in FIG. 6A. In some implementations, the process 610 may be performed by an apparatus, which may be an apparatus included in a satellite or the satellite itself, such as satellite 140 in FIG. 1, satellite 302 in FIG. 3, satellite 402 in FIG. 4A, satellite 452 in FIG. 4B, or satellite 502 in FIG. 5.

At 612, the apparatus identifies a satellite behavior change to occur. In some implementations, the apparatus identifies one or more of: a satellite attitude change (614), such as a pitch, roll, or yaw; a transmit power change (616), such as a beam transmit power; or a coverage area change (618), such as a beam transmit direction change or a beam focus change. At 620, the apparatus also identifies a time when or a satellite location where the satellite behavior change is to occur. In some implementations, the apparatus identifies a time to begin the satellite behavior change (622). The apparatus may also identify a time duration for the satellite behavior change (624). In some implementations, the apparatus identifies a satellite location to begin the satellite behavior change (626). The apparatus may also identify a satellite location to end the satellite behavior change (628).

FIG. 6C shows a flowchart illustrating an example process 630 for signaling one or more satellite behavior changes to a UE. The process 630 may be an example implementation of step 604 in FIG. 6A. In some implementations, the process 630 may be performed by an apparatus, which may be an apparatus included in a satellite or the satellite itself, such as satellite 140 in FIG. 1, satellite 302 in FIG. 3, satellite 402 in FIG. 4A, satellite 452 in FIG. 4B, or satellite 502 in FIG. 5.

At 632, the apparatus or satellite outputs contents of a vector or table indicating the satellite behavior change (632). The output may be one or more SIBs transmitted to the UE, the output may be during a dedicated signaling between the satellite and the UE, or the output may be any other suitable format or signaling scheme to provide the contents from the satellite to the UE. As noted herein, outputting the contents includes outputting a satellite ID for the satellite to perform the behavior change. In some implementations, outputting the contents also includes outputting one or more of: a satellite attitude adjustment and time or satellite location for the adjustment (636); a transmit power adjustment and time or satellite location for the adjustment (638); or a beam coverage adjustment and time or satellite location for the adjustment (640).

As noted herein, a satellite may be configured to indicate one or more neighboring satellite behavior changes to a UE. For example, a satellite may transmit a neighboring satellite behavior change in addition to a behavior change performed by the transmitting satellite.

FIG. 6D shows a flowchart illustrating an example process 650 for indicating one or more neighboring satellite behavior changes to a UE. In some implementations, the process 650 may be performed by an apparatus, which may be an apparatus included in a satellite or the satellite itself, such as satellite 140 in FIG. 1, satellite 302 in FIG. 3, satellite 402 in FIG. 4A, satellite 452 in FIG. 4B, or satellite 502 in FIG. 5.

At 652, the apparatus identifies one or more neighboring satellite behavior changes to occur for one or more neighboring satellites of the NTN. For example, the network may signal to the satellite one or more neighboring satellite behavior changes to occur that are to be signaled to one or more UEs serviced by the satellite. At 654, the apparatus signals, by the satellite, the one or more neighboring satellite behavior changes to the UE. For example, the apparatus outputs one or more SIBs for the UE indicating the one or more neighboring satellite behavior changes to occur.

The apparatus may be configured to perform more operations than as depicted in FIGS. 6A-6D (such as various other operations described herein). As such, the disclosure is not limited exclusively to the examples provided in the Figures.

FIG. 7A shows a flowchart illustrating an example process 700 for UE operation based on a satellite behavior change. In some implementations, the process 700 may be performed by an apparatus, which may be an apparatus included in a UE or the UE itself, such as UE 115 in FIG. 1 or UE 504 in FIG. 5. At 702, the apparatus may obtain, from a satellite of an NTN servicing the UE, a signaling of a satellite behavior change to occur for the satellite. For example, the UE may receive one or more SIBs including contents of a vector or table indicating a satellite ID associated with the satellite behavior change, the satellite behavior change type, and a time when or a satellite location where the satellite behavior change is to occur. At 704, the apparatus adjusts one or more UE parameters for cellular communication based on the obtained signaling. For example, the UE may adjust handover parameters, satellite or cell selection or reselection parameters, transmit power control parameters, and so on.

FIG. 7B shows a flowchart illustrating an example process 710 for a UE to obtain a satellite behavior change. The process 710 may be an example implementation of step 702 in FIG. 7A. In some implementations, the process 710 may be performed by an apparatus, which may be an apparatus included in a UE or the UE itself, such as UE 115 in FIG. 1 or UE 504 in FIG. 5. At 712, the apparatus obtains an indication of a satellite behavior change. In obtaining the indication, the apparatus obtains a satellite ID of the satellite to perform the behavior change (714). In some implementations, the apparatus also obtains one or more of: a satellite attitude adjustment and time or satellite location for the adjustment (716); a transmit power adjustment and time or satellite location for the adjustment (718); or a beam coverage adjustment and time or satellite location for the adjustment (720).

As noted herein, the UE parameter adjustments may be based on the satellite behavior change (such as the identified satellite, the type of satellite behavior change, and the timing or satellite location for the satellite behavior change). The apparatus may be configured to perform more operations than as depicted in FIGS. 7A and 7B (such as various other operations described herein). As such, the disclosure is not limited exclusively to the examples provided in the Figures.

The following provides an overview of aspects of the present disclosure:

Aspect 1: A method for wireless communications at a satellite, comprising: identifying a satellite behavior change to occur for a satellite of a non-terrestrial network for cellular communications; formatting the satellite behavior change to be sent in a dedicated signaling between a UE and the satellite, or in one or more system information blocks (SIBs), or both; and signaling, by the satellite, the satellite behavior change to the UE based at least in part on the formatting.

Aspect 2: The method of aspect 1, wherein the satellite behavior change includes a change in one or more of a satellite attitude, a transmit power of one or more satellite beams, or a coverage area of one or more satellite beams.

Aspect 3: The method of any of aspects 1 through 2, wherein signaling the satellite behavior change further comprises: indicating a start time of the satellite behavior change, a time duration of the satellite behavior change, or both.

Aspect 4: The method of any of aspects 1 through 3, wherein signaling the satellite behavior change further comprises: indicating a start location of the satellite behavior change, an end location of the satellite behavior change, or both.

Aspect 5: The method of any of aspects 1 through 4, wherein signaling the satellite behavior change further comprises: outputting contents of a vector or table, wherein the contents include a satellite identification and one or more of: a satellite attitude adjustment and a time or satellite location associated with the satellite attitude adjustment; a transmit power adjustment and a time or satellite location associated with the transmit power adjustment; or a beam coverage adjustment and a time or satellite location associated with the beam coverage adjustment.

Aspect 6: The method of any of aspects 1 through 5, further comprising: restricting signaling of the satellite behavior change to a defined period of time before the satellite behavior change is to occur.

Aspect 7: The method of any of aspects 1 through 6, further comprising: identifying one or more neighboring satellite behavior changes to occur for one or more neighboring satellites of the non-terrestrial network for cellular communications; and signaling, by the satellite, the one or more neighboring satellite behavior changes along with signaling the satellite behavior change.

Aspect 8: The method of any of aspects 1 through 7, further comprising: indicating to the UE, in a SIB1, a scheduling of information for the satellite behavior change to be output.

Aspect 9: The method of aspect 8, wherein the SIB1 indicates whether the information for the satellite behavior change is to be output periodically by the satellite and one or more parameters of a periodicity of the output.

Aspect 10: The method of any of aspects 1 through 9, wherein the one or more SIBs indicate a satellite ephemeris.

Aspect 11: The method of any of aspects 1 through 10, further comprising: restricting outputting the information for the satellite behavior change in the one or more SIBS to a defined period of time before the satellite behavior change is to occur.

Aspect 12: The method of aspect 11, further comprising: transmitting one or more paging messages to the UE, the one or more paging messages indicating that one or more SIBs including the information for the satellite behavior change are to be output to the UE.

Aspect 13: The method of any of aspects 1 through 12, further comprising: signaling one or more neighboring satellite behavior changes in the one or more SIBs, wherein the signaling of the satellite behavior change is in a first set of SIBs of the one or more SIBs, and the signaling of the one or more neighboring satellite behavior changes is in a second set of SIBs of the one or more SIBs.

Aspect 14: The method of any of aspects 1 through 13, wherein the dedicated signaling is sent during a connected mode between the satellite and the UE.

Aspect 15: A method for wireless communications at a UE, comprising: obtaining, from a satellite servicing the UE, a signaling of a satellite behavior change to occur for the satellite, wherein the satellite is included in a non-terrestrial network for cellular communications; and adjusting one or more UE parameters based on the obtained signaling, wherein the one or more UE parameters are associated with satellite or beam selection and reselection, handover of the UE, transmit power control, or any combination thereof.

Aspect 16: The method of aspect 15, wherein the satellite behavior change includes a change in one or more of a satellite attitude, a transmit power of one or more satellite beams, or a coverage area of one or more satellite beams.

Aspect 17: The method of aspect 16, wherein the signaling of the satellite behavior change further comprises: indicating a start time of the satellite behavior change, a time duration of the satellite behavior change, or both.

Aspect 18: The method of any of aspects 16 through 17, wherein the signaling of the satellite behavior change further comprises: indicating a start location of the satellite behavior change, an end location of the satellite behavior change, or both.

Aspect 19: The method of any of aspects 15 through 18, wherein obtaining the signaling of the satellite behavior change further comprises: obtaining contents of a vector or table, wherein the contents include a satellite identification and one or more of: a satellite attitude adjustment and a time or satellite location associated with the satellite attitude adjustment; a transmit power adjustment and a time or satellite location associated with the transmit power adjustment; or a beam coverage adjustment and a time or satellite location associated with the beam coverage adjustment.

Aspect 20: The method of any of aspects 15 through 19, further comprising: obtaining, from the satellite, signaling of one or more neighboring satellite behavior changes to occur for one or more neighboring satellites of the non-terrestrial network for cellular communications.

Aspect 21: The method of any of aspects 15 through 20, wherein obtaining the signaling of the satellite behavior change includes obtaining information for the satellite behavior change in one or more system information blocks (SIBs) from the satellite.

Aspect 22: The method of aspect 21, further comprising: obtaining an indication, in a SIB1 from the satellite, information for the satellite behavior change to be obtained.

Aspect 23: The method of aspect 22, wherein the SIB1 indicates whether the information for the satellite behavior change is to be output periodically by the satellite and one or more parameters of a periodicity of the output.

Aspect 24: The method of any of aspects 21 through 23, wherein the obtained information for the satellite behavior change is included in a SIB defined to indicate a satellite ephemeris.

Aspect 25: The method of any of aspects 21 through 24, further comprising: obtaining one or more paging messages from the satellite, the one or more paging messages indicating that one or more SIBs including the information for the satellite behavior change are to be output by the satellite.

Aspect 26: The method of any of aspects 21 through 25, further comprising: obtaining one or more neighboring satellite behavior changes in the one or more SIBs, wherein the signaling of the satellite behavior change is in a first set of SIBs of the one or more SIBs, and the signaling of the one or more neighboring satellite behavior changes is in a second set of SIBs of the one or more SIBs.

Aspect 27: The method of any of aspects 15 through 26, wherein obtaining the satellite behavior change is in a dedicated signaling between the satellite and the UE.

Aspect 28: An apparatus for wireless communications at a satellite, comprising a processor; memory coupled with the processor; and instructions stored in the memory and executable by the processor to cause the apparatus to perform a method of any of aspects 1 through 14.

Aspect 29: An apparatus for wireless communications at a satellite, comprising at least one means for performing a method of any of aspects 1 through 14.

Aspect 30: A non-transitory computer-readable medium storing code for wireless communications at a satellite, the code comprising instructions executable by a processor to perform a method of any of aspects 1 through 14.

Aspect 31: An apparatus for wireless communications at a UE, comprising a processor; memory coupled with the processor; and instructions stored in the memory and executable by the processor to cause the apparatus to perform a method of any of aspects 15 through 27.

Aspect 32: An apparatus for wireless communications at a UE, comprising at least one means for performing a method of any of aspects 15 through 27.

Aspect 33: A non-transitory computer-readable medium storing code for wireless communications at a UE, the code comprising instructions executable by a processor to perform a method of any of aspects 15 through 27.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable sub-combination. As such, although features may be described above as acting in particular combinations, and even initially claimed as such, one or more features from a claimed combination can in some implementations be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. An apparatus for wireless communications at a satellite of a non-terrestrial network, comprising:
   a processor;
   memory coupled with the processor; and
   instructions stored in the memory and executable by the processor to cause the apparatus to:

identify a satellite behavior change to occur for the satellite of the non-terrestrial network, wherein the satellite behavior change comprises at least an adjustment of satellite attitude;

format an indication of the satellite behavior change to be sent in a dedicated signaling between a user equipment (UE) and the satellite, or in one or more system information blocks (SIBs), or both, wherein the dedicated signaling includes an indication of a start time of the satellite behavior change, a time duration of the satellite behavior change, or both; and signal, by the satellite, the satellite behavior change including at least the adjustment of the satellite attitude to the UE during a threshold period of time before the start time of the satellite behavior change based at least in part on the formatting.

2. The apparatus of claim 1, wherein the satellite behavior change includes a change in one or more of:
the satellite attitude;
a transmit power of one or more satellite beams; or
a coverage area of the one or more satellite beams.

3. The apparatus of claim 1, wherein signaling the satellite behavior change includes indicating a start location of the satellite behavior change, an end location of the satellite behavior change, or both.

4. The apparatus of claim 1, wherein signaling the satellite behavior change includes outputting contents of a vector or table, wherein the contents include a satellite identification and one or more of:
a satellite attitude adjustment and a time or satellite location associated with the satellite attitude adjustment;
a transmit power adjustment and a time or satellite location associated with the transmit power adjustment; or
a beam coverage adjustment and a time or satellite location associated with the beam coverage adjustment.

5. The apparatus of claim 1, wherein the instructions are further executable by the processor to cause the apparatus to:
restrict signaling of the satellite behavior change to the threshold period of time before the satellite behavior change is to occur.

6. The apparatus of claim 1, wherein the instructions are further executable by the processor to cause the apparatus to:
identify one or more neighboring satellite behavior changes to occur for one or more neighboring satellites of the non-terrestrial network; and
signal, by the satellite, the one or more neighboring satellite behavior changes along with signaling the satellite behavior change.

7. The apparatus of claim 1, wherein the instructions are further executable by the processor to cause the apparatus to:
indicate to the UE, in a SIB1, a scheduling of information for the satellite behavior change to be output.

8. The apparatus of claim 7, wherein the SIB1 indicates whether the information for the satellite behavior change is to be output periodically by the satellite and one or more parameters of a periodicity of the output.

9. The apparatus of claim 1, wherein the one or more SIBs indicate a satellite ephemeris.

10. The apparatus of claim 1, wherein the instructions are further executable by the processor to cause the apparatus to:
restrict outputting information for the satellite behavior change in the one or more SIBS to the threshold period of time before the satellite behavior change is to occur.

11. The apparatus of claim 10, wherein the instructions are further executable by the processor to cause the apparatus to:
transmit one or more paging messages to the UE, the one or more paging messages indicating that one or more SIBs including the information for the satellite behavior change are to be output to the UE.

12. The apparatus of claim 1, wherein the instructions are further executable by the processor to cause the apparatus to signal one or more neighboring satellite behavior changes in the one or more SIBs, wherein:
the signaling of the satellite behavior change is in a first set of SIBs of the one or more SIBs; and
the signaling of the one or more neighboring satellite behavior changes is in a second set of SIBs of the one or more SIBs.

13. The apparatus of claim 1, wherein the dedicated signaling is sent during a connected mode between the satellite and the UE.

14. A method for wireless communications at a satellite of a non-terrestrial network, comprising:
identifying a satellite behavior change to occur for the satellite of the non-terrestrial network for cellular communications, wherein the satellite behavior change comprises at least an adjustment of satellite attitude;
formatting an indication of the satellite behavior change to be sent in a dedicated signaling between a user equipment (UE) and the satellite, or in one or more system information blocks (SIBs), or both, wherein the dedicated signaling includes an indication of a start time of the satellite behavior change, a time duration of the satellite behavior change, or both; and
signaling, by the satellite, the satellite behavior change including at least the adjustment of the satellite attitude to the UE during a threshold period of time before the start time of the satellite behavior change based at least in part on the formatting.

15. An apparatus for wireless communications at a user equipment (UE), comprising:
a processor;
memory coupled with the processor; and
instructions stored in the memory and executable by the processor to cause the apparatus to:
obtain, from a satellite servicing the UE, a signaling of a satellite behavior change that is to occur, including at least an adjustment of satellite attitude and an indication of a start time of the satellite behavior change, a time duration of the satellite behavior change, or both, for the satellite during a threshold period of time before the satellite behavior change is to occur, wherein the satellite is included in a non-terrestrial network, and wherein the satellite behavior change comprises at least the adjustment of satellite attitude; and
adjust one or more UE parameters based on the obtained signaling, wherein the one or more UE parameters are associated with satellite or beam selection and reselection, handover of the UE, transmit power control, or any combination thereof.

16. The apparatus of claim 15, wherein the satellite behavior change comprises one or more of:
the satellite attitude;
a transmit power of one or more satellite beams; or
a coverage area of the one or more satellite beams.

17. The apparatus of claim 16, wherein the signaling of the satellite behavior change includes indicating a start location of the satellite behavior change, an end location of the satellite behavior change, or both.

18. The apparatus of claim 15, wherein the satellite behavior change further includes:

a satellite attitude adjustment and a time or satellite location associated with the satellite attitude adjustment;

a transmit power adjustment and a time or satellite location associated with the transmit power adjustment; or a beam coverage adjustment and a time or satellite location associated with the beam coverage adjustment.

19. The apparatus of claim 15, wherein the instructions are further executable by the processor to cause the apparatus to:

obtain, from the satellite, signaling of one or more neighboring satellite behavior changes to occur for one or more neighboring satellites of the non-terrestrial network.

20. The apparatus of claim 15, wherein obtaining the signaling of the satellite behavior change includes obtaining information for the satellite behavior change in one or more system information blocks (SIBs) from the satellite.

21. The apparatus of claim 20, wherein the instructions are further executable by the processor to cause the apparatus to:

obtain an indication, in a SIB1 from the satellite, the information for the satellite behavior change to be obtained.

22. The apparatus of claim 21, wherein the SIB1 indicates whether the information for the satellite behavior change is to be output periodically by the satellite and one or more parameters of a periodicity of the output.

23. The apparatus of claim 20, wherein the obtained information for the satellite behavior change is included in a SIB defined to indicate a satellite ephemeris.

24. The apparatus of claim 20, wherein the instructions are further executable by the processor to cause the apparatus to:

obtain one or more paging messages from the satellite, the one or more paging messages indicating that the one or more SIBs including the information for the satellite behavior change are to be output by the satellite.

25. The apparatus of claim 20, wherein the instructions are further executable by the processor to cause the apparatus to:

obtain one or more neighboring satellite behavior changes in the one or more SIBS, wherein the signaling of the satellite behavior change be in a first set of SIBs of the one or more SIBs and the signaling of the one or more neighboring satellite behavior changes be in a second set of SIBs of the one or more SIBs.

26. The apparatus of claim 15, wherein obtaining the satellite behavior change is in a dedicated signaling between the satellite and the UE.

27. The apparatus of claim 26, wherein the dedicated signaling is during a connected mode between the satellite and the UE.

28. A method for wireless communications at a user equipment (UE), comprising:

obtaining, from a satellite servicing the UE, a signaling of a satellite behavior change that is to occur, including at least an adjustment of satellite attitude and an indication of a start time of the satellite behavior change, a time duration of the satellite behavior change, or both, for the satellite during a threshold period of time before the satellite behavior change is to occur, wherein the satellite is included in a non-terrestrial network, and wherein the satellite behavior change comprises at least the adjustment of the satellite attitude; and adjusting one or more UE parameters based on the obtained signaling, wherein the one or more UE parameters are associated with satellite or beam selection and reselection, handover of the UE, transmit power control, or any combination thereof.

\* \* \* \* \*